2 Sheets--Sheet 1.

J. C. BREWSTER.

Desulphurizing Oven.

No. 6,278. Reissued Feb. 9, 1875.

Witnesses:
Henry Gentner
Ernst Bilhuber.

Inventor.
John C. Brewster
per
Van Santwood & Hauff
Attys.

2 Sheets--Sheet 2.

J. C. BREWSTER.

Desulphurizing Oven.

No. 6,278. Reissued Feb. 9, 1875.

Witnesses:
Henry Gentner
Ernst Bilhucker.

Inventor:
John C. Brewster
per
Van Santvoord & Hauff
Attys

BEST AVAILABLE COPY

UNITED STATES PATENT OFFICE.

JOHN C. BREWSTER, OF NEW YORK, N. Y., ASSIGNOR OF PART INTEREST TO PETER HIMROD AND DANIEL PETERS.

IMPROVEMENT IN DESULPHURIZING-OVENS.

Specification forming part of Letters Patent No. 99,143, dated January 25, 1870; reissue No. 6,278, dated February 9, 1875; application filed December 24, 1874.

*To all whom it may concern:*

Figure 1:
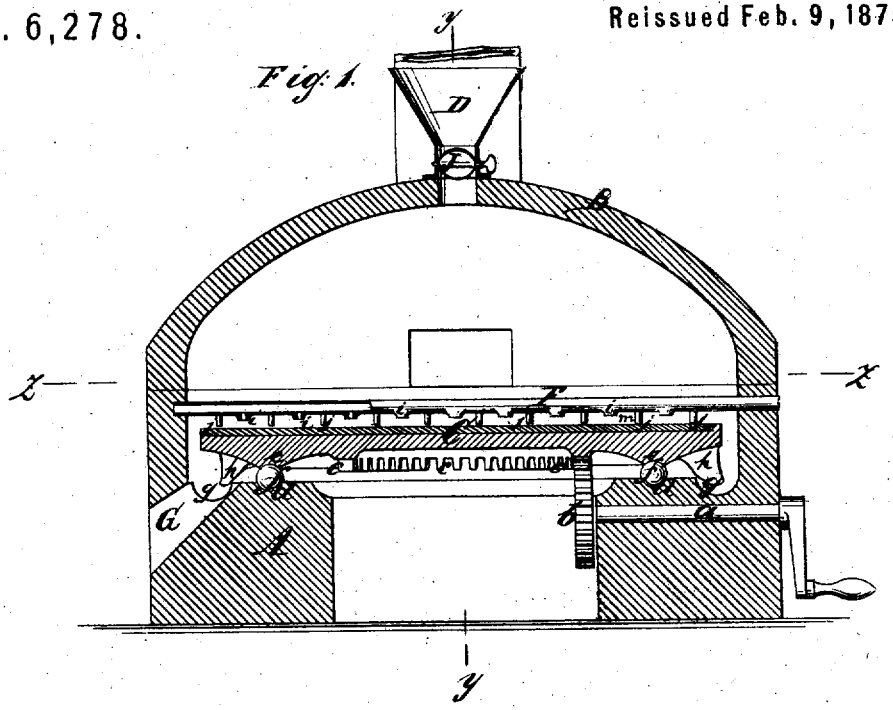
Figure 2:
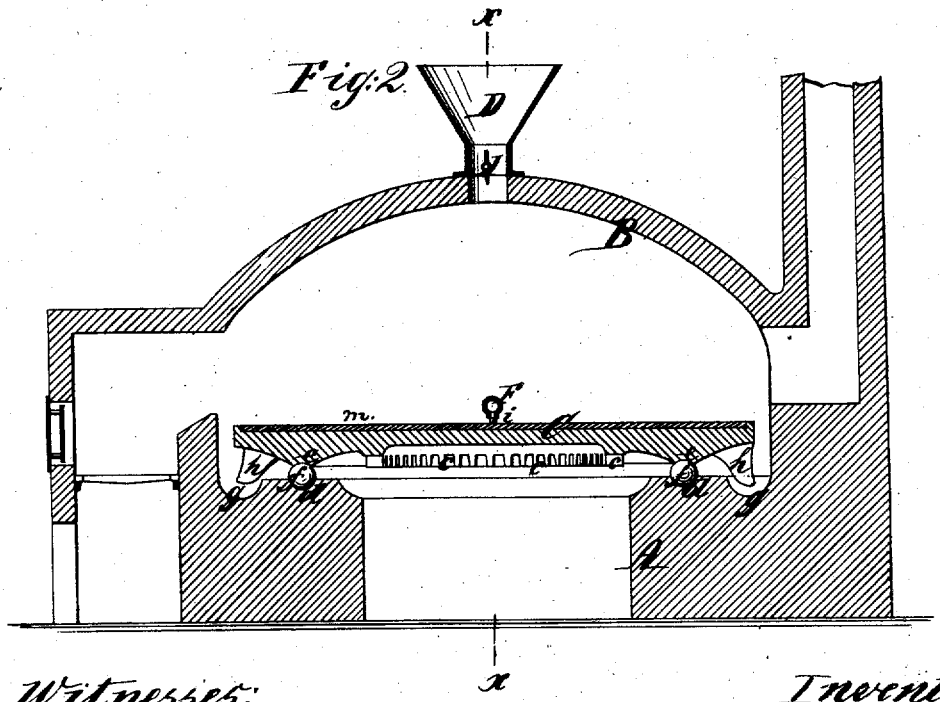
Figure 3:
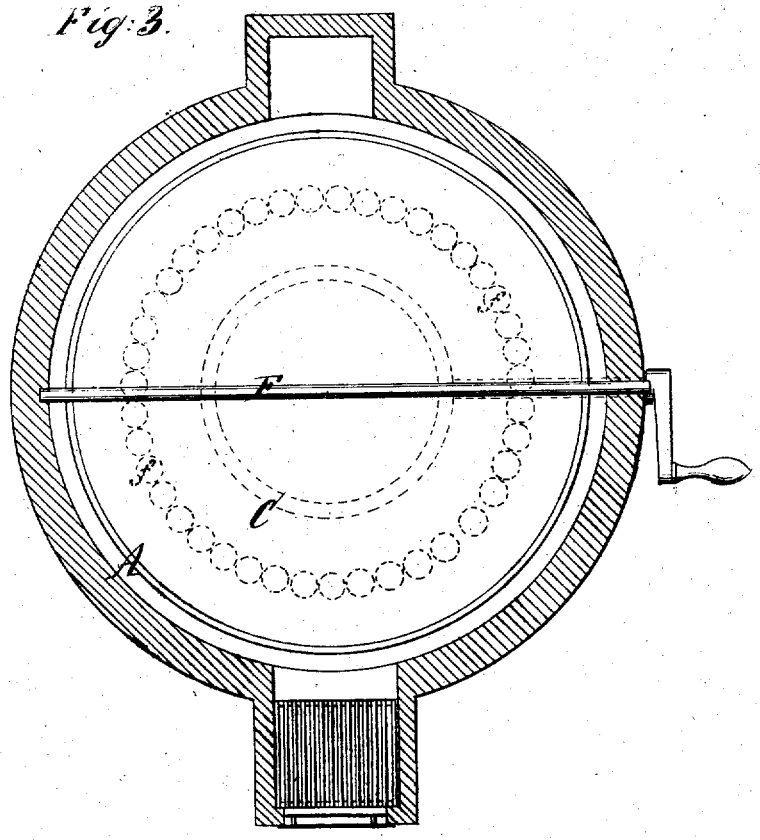

Be it known that I, JOHN C. BREWSTER, of the city, county, and State of New York, have invented a certain new and useful Improvement in Desulphurizing-Ovens, of which the following is a specification:

This invention is illustrated in the accompanying drawing, in which Figure 1 represents a vertical section in the plane *x x*, Fig. 2. Fig. 2 is a similar section in the plane *y y*, Fig. 1. Fig. 3 is a horizontal section in the plane *z z*, Fig. 1.

Similar letters indicate corresponding parts.

My invention relates to furnaces or ovens for desulphurizing ores or minerals which have been previously stamped or crushed.

This invention consists in constructing the base of an oven for desulphurizing ores with a groove for receiving and holding friction balls or rollers, and a seat for receiving a horizontal shaft, which carries a pinion at the end for operating the revolving table, which rests upon the friction balls or rollers arranged in the groove in the base of the oven.

The revolving table is constructed with a groove, into which the friction balls and rollers fit, and with a gear-wheel, with which the pinion on the horizontal shaft meshes. Across the revolving table passes an air pipe or tube, having jet-openings and agitating-fingers, and situated close to the table, in such a manner that as the table revolves the air is thrown down through the apertures in the tube, under and among the ores spread on the table, while the latter is kept in motion, and the ore is constantly stirred by the fingers.

The invention further consists in the combination, with a furnace having a revolving table, of a channel for receiving the ore from the table, and a series of wipers, constructed to automatically remove the ore from the furnace through a discharge-opening, as will be hereinafter described.

In the drawing, the letter A designates the base of the oven, which is constructed, preferably, of a circular form, and provided with the necessary fire-place and chimney. B is the top or crown of my oven, constructed of an arched shape to deflect the flames and heat upon the ore, and provided with a hopper, D, for introducing the ore. The revolving table C rests upon the anti-friction rollers *f f*, which play in the grooves *d e*, the former situated in the base of the oven, and the latter in the under surface of the table. Said table receives its motion through a shaft, *a*, carrying a pinion, *b*, which engages with cogs *c* on the under surface of the table. The surface of the table is composed of a stratum of fire-clay, *m*, which is laid within a flange or rim on the circumference. F is a tube, through which air is admitted to the ore spread on the table C. This tube is situated immediately above the surface of the table, and it is provided with a series of apertures, *i*, and a series of fingers, *j*, so that as the table revolves beneath it the air is thrown down through the apertures of the tube, among the ore spread upon the table, while the latter is kept in motion and constantly stirred by the action of the fingers. The supply of ore from the hopper D, regulated by a gate, J, in it, falls upon the center of the revolving table, where it is spread by the action of the fingers *j*, and gradually worked off the edge of the table, whence it falls into the channel or trough *g*. A series of sweeps, *h h*, attached to the under side of the table, then act upon it to discharge it through the orifice G.

What I claim as new, and desire to secure by Letters Patent, is—

1. The base of the oven, constructed with a groove for receiving friction-balls, and a seat for the shaft *a*, carrying the pinion *b*, in combination with the rotary table, having the groove *e*, gearing *c*, and a stationary air-pipe having jet-openings, substantially as described.

2. The combination, with the revolving table in a furnace, of a receiving channel or trough, and of wipers, for the purpose of automatically removing the ore from the furnace, substantially as shown and described.

Witnesses: JOHN C. BREWSTER.
PETER HIMROD,
E. F. KASTENHUBER.